United States Patent [19]
Mollenauer et al.

[11] Patent Number: 4,699,452
[45] Date of Patent: Oct. 13, 1987

[54] OPTICAL COMMUNICATIONS SYSTEM COMPRISING RAMAN AMPLIFICATION MEANS

[75] Inventors: Linn F. Mollenauer, Colts Neck; Rogers H. Stolen, Rumson, both of N.J.

[73] Assignee: American Telephone and Telegraph Company, AT&T Bell Laboratories, Murray Hill, N.J.

[21] Appl. No.: 791,915
[22] Filed: Oct. 28, 1985
[51] Int. Cl.4 .............................................. G02B 6/28
[52] U.S. Cl. ............................. 350/96.16; 350/96.23
[58] Field of Search ............... 350/96.15, 96.16, 96.18, 350/96.23; 372/3, 6, 23, 69

[56] References Cited

U.S. PATENT DOCUMENTS

| | | | |
|---|---|---|---|
| 4,114,112 | 9/1978 | Epstein et al. | 372/23 |
| 4,401,364 | 8/1983 | Mochizuki | 350/96.16 |
| 4,406,516 | 9/1983 | Hasegawa | 350/96.29 |
| 4,546,476 | 10/1985 | Shaw et al. | 350/96.15 X |
| 4,560,246 | 12/1985 | Cotter | 350/96.16 |

OTHER PUBLICATIONS

LaBudde, P., et al., "Bandwidth Reduction in CW Fiber Raman Lasers", *IEEE J. Quantum Elec.*, vol. QE-16, No. 2, Feb. 1980, pp. 115-117.
*Proceedings of the IEEE*, vol. 68, No. 10, Oct. 1980, "Nonlinearity in Fiber Transmission" by R. H. Stolen, pp. 1232-1236.
*Electronics Letters*, vol. 18, No. 22, Oct. 28, 1982, "Raman Amplification at 1.118 μm in Single-Mode Fibre and its Limitation by Brillouin Scattering" by G. A. Koepf et al., pp. 942-943.
*Appl. Phys. Lett.*, vol. 21, No. 11, Dec. 1, 1972, "Stimulated Brillouin Scattering in Optical Fibers" by E. P. Ippen et al, pp. 539-541.
*Electronics Letters*, vol. 18, No. 15, Jul. 22, 1982, "Suppression of Stimulated Brillouin Scattering During Transmission of High-Power Narrowband Laser Light in Monomode Fiber" by D. Cotter, pp. 638-640.
*Electronics Letters*, vol. 21, No. 7, Mar. 28, 1985, "CW Pumped Preamplifier in a 45 km-Long Fibre Transmission System Operating at 1.5 μm and 1 Gbit/s" by J. Hegarty et al, pp. 290-292.
*Appl. Phys. Lett.*, vol. 23, No. 3, Aug. 1, 1973, "Transmission of Stationary Nonlinear Optical Pulses in Dispersive Dielectric Fibers. 1. Anomalous Dispersion: " by A. Hasegawa et al., pp. 142-144.
*Physical Review Letters*, vol. 45, No. 13, Sep. 29, 1980, "Experimental Observation of Picosecond Pulse Narrowing and Solitons in Optical Fibers" by L. F. Mollenauer et al., pp. 1095-1098.
*Applied Optics*, vol. 23, No. 19, Oct. 1, 1984, "Numerical Study of Optical Soliton Transmission Amplified Periodically by the Stimulated Raman Process" by A. Hasegawa, pp. 3302-3309.
*Optics Letters*, vol. 10, May 1985, "Experimental Demonstration of Soliton Propagation in Long Fibers: Loss Compensated by Raman Gain" by L. F. Mollenauer et al, pp. 229-231.
*Optical Fiber Telecommunications*, 1979, Academic Press, by S. E. Miller et al, pp. 127-135.
*Optics Letters*, vol. 8, No. 12, Dec. 1983, "Amplification and Reshaping of Optical Solitons in a Glass Fiber–IV: Use of the Stimulated Raman Process" by A. Hasegawa, pp. 650-652.

*Primary Examiner*—Eugene R. LaRoche
*Assistant Examiner*—Steven J. Mottola
*Attorney, Agent, or Firm*—Eugen E. Pacher

[57] ABSTRACT

An optical fiber communications system with Raman amplification of the signal radiation comprises a broadband pump radiation source, or, preferably a multiplicity of pump radiation sources. The sources are selected to result in a pump radiation spectrum such that pump radiation intensity in the fiber core is less than a critical intensity $I_c$. In particular, the average intensity of pump radiation in a first spectral interval, centered on any wavelength $\lambda_p$ in the pump radiation spectrum and of width equal to the Brillouin line width of the fiber at $\lambda_p$, is to be less than that average intensity in the first spectral interval that results in conversion of 10% of the radiation in the first spectral interval to stimulated Brillouin radiation. Use of a multiplicity of pump sources not only can reduce pump noise and pump depletion due to stimulated Brillouin scattering, but typically also can result in enhanced system reliability and lower cost. In a preferred embodiment, the invention is a soliton fiber communications system, with pump radiation injected at one or more intermediate fiber locations.

6 Claims, 8 Drawing Figures

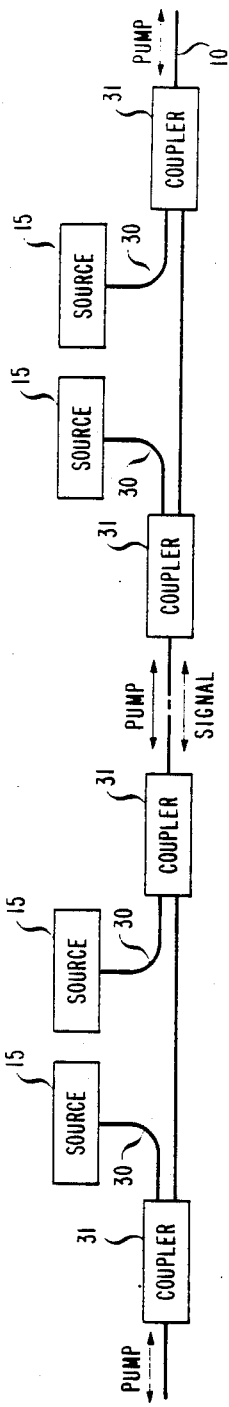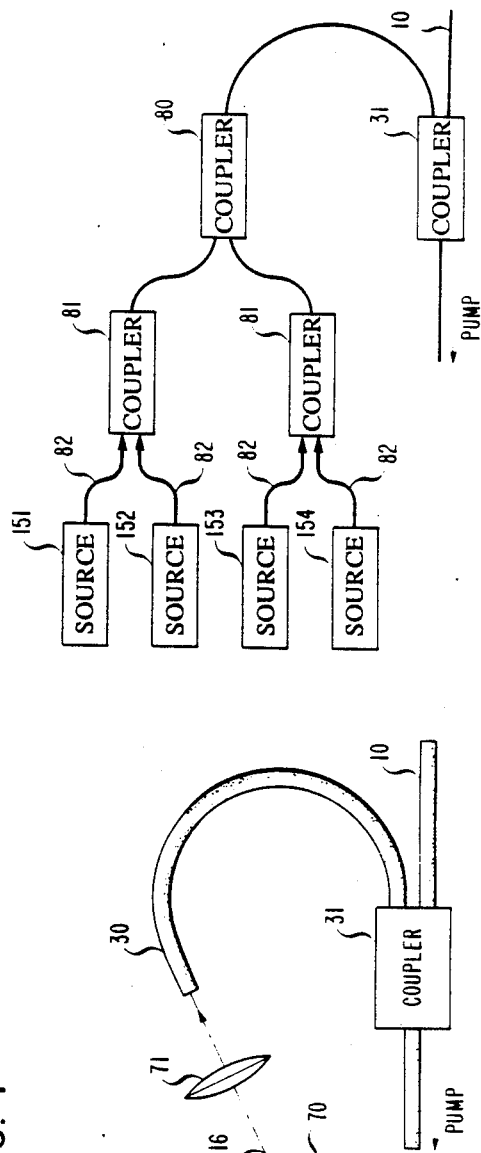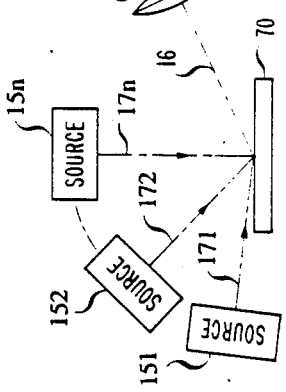
FIG. 6
FIG. 7
FIG. 8

OPTICAL COMMUNICATIONS SYSTEM COMPRISING RAMAN AMPLIFICATION MEANS

FIELD OF THE INVENTION

This invention pertains to the field of optical communications. In particular, it pertains to fiber communications systems comprising Raman amplification means.

BACKGROUND OF THE INVENTION

Currently used long haul optical fiber communications systems typically require signal regenerators. Such devices detect the optical signal, produce a corresponding electronic signal which is amplified, reshaped and, typically, retimed, and then used to drive an appropriate radiation source, thereby producing a fresh optical pulse that is injected into the fiber. However, it has been known for some time that it is possible to amplify, and, under appropriate conditions even reshape, optical pulses without use of electronic regenerators of the type referred to above. In particular, it has been recognized that the Raman effect may be used to amplify optical signals. See, for instance, R. H. Stolen, *Proceedings of the IEEE*, Vol. 68, No. 10 (1980), pp. 1232-1236, incorporated herein by reference.

Although Raman amplification is possible in fibers other than silica-based (i.e., containing at least 50% by weight, typically >80% by weight, $SiO_2$) optical fibers, for the sake of concreteness, the exposition below will frequently refer to, and use material constants appropriate for, silica-based fiber. Such fibers have two loss minima in the approximate range 1.2-1.6 $\mu m$, and therefore communications systems that use silica-based fiber frequently use signal radiation whose wavelength lies in that range.

Stimulated Raman Scattering (SRS) is known to produce substantial gain in fused silica for frequency shifts in the range from about 100 to about 600 $cm^{-1}$, with the maximum gain occurring for a frequency shift of about 450 $cm^{-1}$. This means that, in silica-based optical fiber, radiation of wavelengths $\lambda_o$ (to be termed the signal radiation) can be amplified by means of pump radiation that is down-shifted in wavelength from $\lambda_o$ by amounts corresponding to shifts in wave number by about 100 to 600 $cm^{-1}$. For instance, for signal radiation of 1.56 $\mu m$, the appropriate pump radiation would have a wavelength between about 1.43 and 1.54 $\mu m$, with peak amplification taking place for pump radiation of about 1.46 $\mu m$. It is also known that there is no inherent threshold power for amplification by SRS, although, in order for usable amplification to take place, a substantial amount of pump power, typically $\gtrsim 10$ mW has to be injected into the fiber, due to the relative smallness of the Raman gain coefficient, which is of the order of $10^{-11}$ cm/watt in fused silica. For instance, in order to achieve a gain of 0.3 dB/km for 1.56 $\mu m$ signal radiation in a single mode silica-based fiber of core area of 25 $(\mu m)^2$, pump power of the order of 100 mW is required, if the pump wavelength is about 1.46 $\mu m$.

It is also known that Stimulated Brillouin Scattering (SBS) can take place in optical fibers, and that such scattering can have a deleterious effect on systems performance, due principally to the fact that SBS can cause severe fluctuations in the pump intensity, which cause corresponding fluctuations in the Raman gain, and to the fact that SBS can result in pump depletion. See, for instance, R. H. Stolen, op. cit. SBS can have a peak gain that is several hundred times that for SRS, per unit frequency of pump radiation, but SBS linewidths are typically very narrow, e.g., of the order of 20 MHz.

G. A. Koepf et al, *Electronics Letters*, Vol. 18 (22), 1982, pp. 942-943, report on Raman amplification at 1.118 $\mu m$ in single mode fiber and its limitation by SBS. They observed a deleterious effect of SBS on the Raman gain, and suggest, inter alia, that an increase in the spectral width of the pump laser by modulation to values larger than the Brillouin linewidth would cause a decrease of the SBS gain and could be used for suppression of Brillouin scattering. See also E. P. Ippen and R. H. Stolen, *Applied Physics Letters*, Vol. 21(11), pp. 539-541 (1972), which reports on the observation of SBS in optical fiber.

D. Cotter, *Electronics Letters*, Vol. 18(15), 1982, pp. 638-640, discloses a technique for suppression of SBS during transmission of high power narrowband laser light in monomode fibers. The technique involves imposition of phase modulation on the optical field launched into the fiber so as to reduce the SBS gain. This is achieved, for instance, by placing between the laser and the fiber a periodically driven optical phase modulator, or by using a mode-beating effect produced when the radiation field comprises two discrete but closely spaced optical frequencies. This, it is suggested, could be achieved by using two single-frequency lasers operating at slightly different wavelengths, or perhaps more easily by using a single laser which is arranged to operate in two longitudinal modes. This principle was applied by J. Hegarty et al, *Electronics Letters*, Vol. 21(7) 1985, pp. 290-292, who used a laser operating in two modes separated by 2 GHz.

Although SRS can be used to amplify "linear" pulses, i.e., pulses in which no particular relationship between pulse peak power and pulse peak width is required, amplification by SRS can be advantageously used in soliton communications systems. A. Hasegawa et al have shown (*Applied Physics Letters*, Vol. 23(3), pp. 142-144 (1973)) that under certain conditions shape-maintaining pulses can exist in single mode optical fiber. Such pulses are termed solitons, and, in silica-based fiber, typically have center wavelengths in the range 1.45-1.60 $\mu m$. The existence of solitons has been experimentally demonstrated (L. F. Mollenauer et al, *Physical Review Letters*, Vol. 45(13), pp. 1095-1098 (1980)), and their utility for high capacity communications systems has been disclosed (U.S. Pat. No. 4,406,516, issued Sept. 27, 1983 to A. Hasegawa, co-assigned with this). Furthermore, it has been found that solitons can be amplified nonelectronically without loss of soliton character (see A. Hasegawa, *Optics Letters*, Vol. 8, pp. 650-652 (1983), incorporated herein by reference). Co-assigned U.S. patent application Ser. No. 701,654 discloses a soliton optical communications system comprising nonelectronic means for increasing the pulse height and decreasing the pulse width of soliton pulses. See also A. Hasegawa, *Applied Optics*, Vol. 23(19), pp. 3302-3309 (1984) incorporated herein by reference. This coupling between pulse height and pulse width is an attribute of solitons, and its existence has been experimentally verified in single mode fiber, with loss compensated by Raman gain. (L. F. Mollenauer et al, *Optics Letters*, Vol. 10, pp. 229-231 (1985).)

Since Raman amplification of signal pulses in fiber communications systems, especially in soliton systems, potentially has substantial advantages over pulse regeneration as currently practiced, a Raman amplification scheme that, among other advantages, avoids the introduction of significant amounts of SBS-caused pump noise yet is easily and inexpensively implemented would be of considerable interest. This application discloses such a system.

BRIEF DESCRIPTION OF THE DRAWINGS

FIGS. 3, 4, 5 and 6 schematically indicate exemplary Raman amplification schemes; and FIGS. 7 and 8 schematically illustrate exemplary techniques for coupling pump radiation into an optical fiber.

The same reference numerals are used to identify analogous features in different figures.

THE INVENTION

A fiberguide communications system according to the invention comprises a broadband source of pump radiation, or, preferably, a multiplicity of sources of pump radiation, with source characteristics such as center wavelengths and spectral widths chosen such that the pump radiation intensity in the fiber core (optical fiber comprises a core of relatively higher refractive index, and, contactingly surrounding the core, a cladding of relatively lower refractive index) at any given wavelength does not exceed a critical value, to be defined below. The multiplicity of pump radiation sources can comprise discrete sources, e.g., discrete semiconductor lasers, gas lasers, or other sources of coherent or noncoherent radiation, or an array of devices integrated on a chip. In a currently preferred embodiment, the sources are discrete semiconductor lasers. It will, of course, be appreciated that a combination of discrete and integrated sources can also be used, or that more than one source-carrying chip may be used. Furthermore, it is to be understood that in long-haul communications systems, including soliton systems, frequently pump radiation is injected into the fiber at a multiplicity of fiber locations. The appropriate spacing between adjacent injection points depends on the characteristics of the communications system and can be determined by known methods (see, for instance, A. Hasegawa, *Applied Optics*, Vol. 23, pp. 3302–3309).

Use of a multiplicity of pump sources according to the invention not only can essentially eliminate SBS-caused pump noise but also results in enhanced system reliability and, possibly, lower capital cost. Reliability is enhanced since failure of one, or even several, pump sources in a system according to the invention need not result in impaired system performance. The remaining sources typically can simply be run at higher output to make up for the failed sources. Also, low power sources often have a longer lifetime than high power sources.

Figure 1:
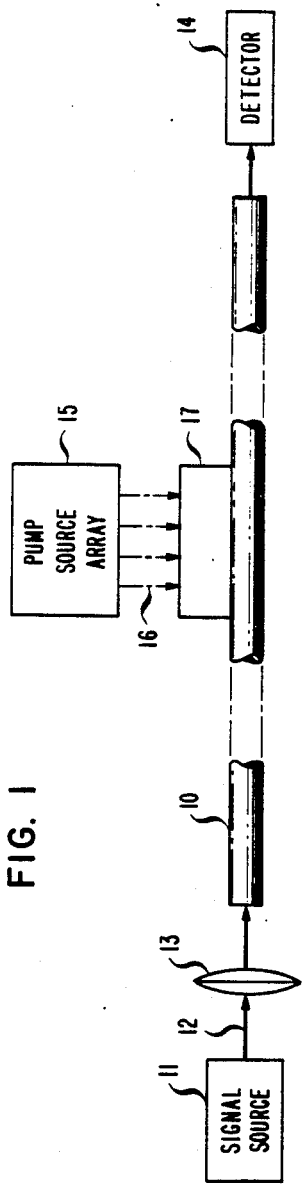
FIG. 1 schematically depicts a communications system according to the invention.

An exemplary communications system according to the invention is schematically depicted in FIG. 1, wherein 10 is an optical fiber, typically single mode fiber, 11 is a source of electromagnetic radiation 12 (of wavelength $\lambda_o$, the signal radiation), 13 refers to means for coupling 12 into the fiber, and 14 to means for detecting signal radiation, e.g., a photodetector. Furthermore, 15 refers to the array of pump radiation sources, 16 to the totality of pump radiation emitted by all active sources of 15, and 17 to means for coupling the pump radiation into the fiber. Such well-known parts of a communications system as drive electronics, detector electronics, splices, attenuators, output means, etc., are not shown in FIG. 1. Furthermore, in a soliton system according to the invention one typically provides means for monitoring and adjusting the pump power and/or the signal power such that the signal pulses remain solitons throughout their transmission through the fiber link. Such means can be conventional.

As is known to those skilled in the art, the pump radiation can be injected into the fiber such that it is co-propagating or counterpropagating with the signal radiation, or it can be injected such that a portion co-propagates whereas the remainder counter-propagates. Typically, the signal radiation is in pulse form, and the pump radiation can be either CW or pulsed. Use of pulsed pump radiation is frequently not advantageous with co-propagating signal pulses.

A major objective of the invention being amplification of the signal radiation by means of SRS without introduction of significant noise power due to SBS, in systems according to the invention the pump power is spread over a spectral region such that the intensity of pump radiation at any given wavelength $\lambda_p$ in the fiber core is less than $I_c$, the critical intensity for SBS at that wavelength.

For purposes of this application we define $I_c$ to be that average radiation intensity in the core of an optical fiber (in the spectral interval that is centered at a wavelength $\lambda_p$ and that is equal in width to the Brillouin linewidth in the fiber at $\lambda_p$) that results in conversion of 10% of the radiation in the spectral interval to stimulated Brillouin radiation.

The "Brillouin linewidth" associated with an optical fiber is the FWHM (full width at half maximum) of the Brillouin spontaneous scattering spectrum in the fiber, as determined with a narrow line source of radiation. A line source is "narrow" if the source line width is much less than the Brillouin linewidth.

As an example, in an optical fiber having a pure, or lightly germania-doped, fused silica core, the Brillouin linewidth of 1.46 µm pump radiation is about 18 MHz. If the fiber is single mode fiber with an 8 µm core diameter and a loss of about 0.2 dB/km, $I_c \sim 0.04$ mW/(µm)$^2$. This implies that the pump power in any 18 MHz wide spectral region at about 1.46 µm is not to exceed about 2 mW.

The radiation intensity I in a single mode fiber is related to the radiation power P as follows: $I = PA_{eff}^{-1}$, where $A_{eff}$ is the effective core area. A method for calculating $A_{eff}$ can be found in *Optical Fiber Telecommunications*, S. E. Miller and A. G. Chynoweth, editors, Academic Press, 1979, pp. 127–135, especially page 130. However, the thus calculated value of $A_{eff}$ typically is sufficiently close to the core area size of a single mode fiber such that for most purposes it is permissible to substitute the value of the core area A for $A_{eff}$.

Figure 2:
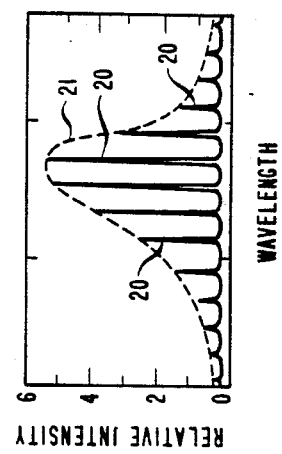
FIG. 2 is an exemplary spectrum of a semiconductor laser.

Although light-emitting diodes and other sources of non-coherent radiation can, in principle, be used in the practice of the invention, we currently consider semiconductor lasers to be preferred sources of pump radiation. As is well known, semiconductor lasers typically have a multi-line emission spectrum, as exemplified in FIG. 2. Each relatively narrow peak 20 is associated with a longitudinal mode of the laser. The mode spacing depends on the laser design, especially the resonator length and the refractive index of the active region, and frequently is of the order 0.1 nm. FIG. 2 also shows the envelope 21 of the emission spectrum.

The intensity envelope of the output of a radiation source can be used to characterize the source output. In particular, the center wavelength and spectral width of a source are herein defined as the wavelength corresponding to the maximum in the intensity envelope and as the full width at half maximum of the intensity envelope, respectively. Semiconductor lasers without mode locking typically have spectral widths of the order of 5 cm$^{-1}$, or equivalently, about 1 nm at $\lambda \sim 1.5$ $\mu$m. Furthermore, in such lasers, the linewidth of a single radiation mode, although narrow, is typically much greater than the Brillouin linewidth. In accordance with our teaching that the pump radiation is to have a finite spectral width such that the above stated intensity criterion is met at all wavelengths, it may be advantageous to use lasers having a large number of lasing modes and/or having relatively broad emission modes.

In fused silica, the peak of the Raman gain coefficient is about 200 cm$^{-1}$ wide (with the region of gain being much wider, of the order of 500 cm$^{-1}$). Thus, the pump sources can be chosen such that their center frequencies are distributed over a spectral region including all or part of the peakwidth, possibly even including all or part of the region of significant gain outside of the peakwidth. If, for instance, $\lambda_o = 1.5$ $\mu$m, and if ten pump radiation sources are to be used, the sources could be selected such that the center frequencies are distributed more or less evenly over the wavelength region between about 1.44 $\mu$m and about 1.48 $\mu$m. The center frequencies thus would differ by about 4 nm, and there would be substantially no overlap of the source spectra. However, it is not necessary that sources be spaced such as to avoid overlap since even if the envelopes of two or more sources overlap, the probability that some mode lines overlap is relatively small. And even if two or more mode lines overlap, the above-specified intensity criterion is typically easily met, since in a system according to the invention, the intensity in a spectral range equal to a Brillouin linewidth in a mode line is typically only a small part of the critical intensity.

Figure 3:
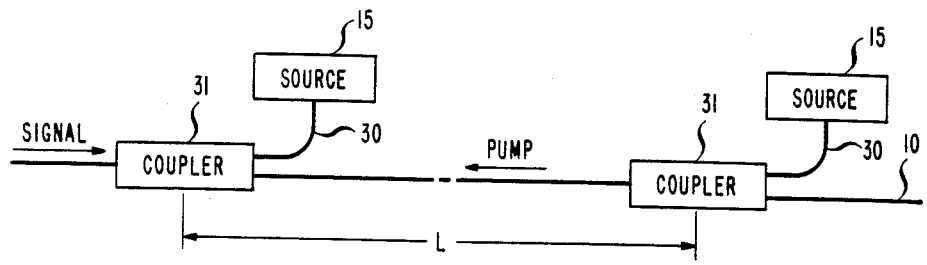
Figure 4:
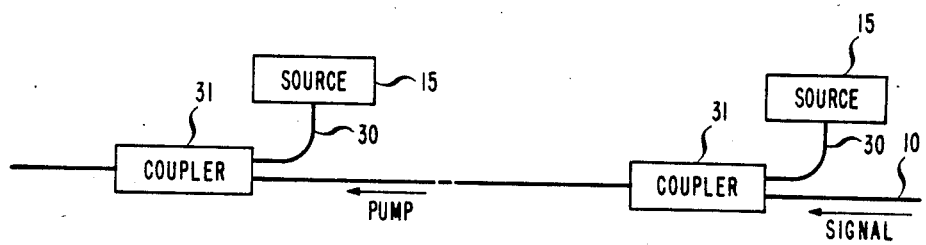
Figure 5:
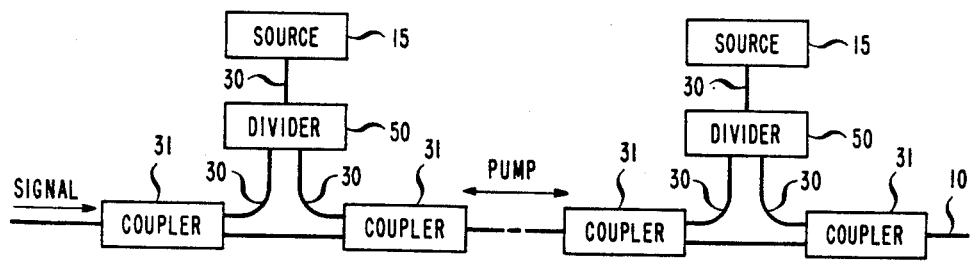

Various exemplary schemes for practicing the invention are schematically indicated in FIGS. 3–6. FIG. 3 shows an optical fiber 10 carrying optical signals in one direction, and pump radiation in the opposite direction, whereas otherwise identical FIG. 4 shows co-propagating signal and pump radiation. FIGS. 5 and 6, on the other hand, show optical fiber carrying pump radiation in both directions, with FIG. 5 showing dividers 50 for splitting the pump radiation, and FIG. 6 illustrating the use of separate pump sources. FIG. 5 also indicates a unidirectional signal stream, whereas FIG. 6 shows bidirectional signal streams. It will be appreciated that the illustrated systems are exemplary only, and that other schemes are also possible. In FIGS. 3–6, reference numeral 15 refers to an aggregate of pump sources, and 30 to optical fiber serving to guide the pump radiation to a coupler 31, (and, in FIG. 5, to a splitter 50). Coupler 31 serves to couple pump radiation onto the transmission fiber without coupling out significant amounts of signal radiation.

A system according to the invention typically also requires means for coupling the outputs of the battery of pump sources onto fiber 30. Exemplary means for achieving this are schematically depicted in FIG. 7, in which 151, 152, ... 15n indicate n sources of pump radiation 171, 172, ... 17n, respectively. The n beams of pump radiation are directed onto the surface of optical grating 70. The grating serves to combine the n individual beams into single beam 16 which is coupled into fiber 30 by appropriate coupling means 71.

Other ways for coupling the output of two or more pump sources onto a single fiber, without causing interaction between the sources, are known. For instance, long taper fused fiber couplers can be used. Another exemplary scheme is schematically depicted in FIG. 8, in which 151–154 refers to four (out of a battery of n) individual pump sources that emit polarized radiation, with, for instance, sources 151 and 153 emitting radiation of center wavelength $\lambda_{p1}$ and $\lambda_{p3}$, respectively, that is polarized perpendicular to some reference direction, and 152 and 154 radiation of wavelength $\lambda_{p2}$ and $\lambda_{p4}$, respectively, that is polarized parallel to the reference direction. Fibers 82 are of the polarization preserving type, couplers 81 are polarization selective couplers (see co-assigned U.S. patent application Ser. No. 737,257, filed May 23, 1985 by A. Ashkin et al), and coupler 80 is of the previously referred-to wavelength dependent type.

Those skilled in the art will appreciate that the coupling of pump radiation onto transmission fiber can be accomplished in a variety of ways, and that still other ways to achieve this will undoubtedly be discovered in the future. All possible ways for coupling the pump radiation from the multiplicity of sources according to the invention are comtemplated to be within the scope of the invention.

Although the use of multiple co-located pump sources is currently preferred by us, it will be appreciated that the invention can also be practiced with a broadband source whose output meets the intensity criterion. For instance, a solid state diode could be used as such a broadband source, provided that means for efficiently coupling its output to a single mode optical fiber can be devised.

EXAMPLE

The optical fiber transmission channel consists of single mode dispersion shifted silica-based fiber having a loss of 0.18 dB/km at 1.56 $\mu$m and of 0.29 dB/km at 1.46 $\mu$m, a dispersion of 2ps/nm.km, an effective core area of 25 ($\mu$m)$^2$, and has a length of 2200 km. A mode-located laser produces bandwidth limited pulses of $\lambda = 1.56$ $\mu$m. The pulses are coupled into the fiber, the laser being adjusted such that the coupled-in pulses have a peak power of 27 mW, are substantially of sech-shape, and have a pulse width of 7.5 ps. The pulses thus are fundamental (N=1) solitons in the fiber. At intervals of about 40 km along the fiber are located pump radiation injection points. At each of these points is located a battery of ten semiconductor laser pump radiation sources, with center wavelengths substantially regularly spaced throughout the wavelength interval 1.44 to 1.48 $\mu$m. The sources have an average halfwidth of 20 nm, and typically emit in about 10 modes. The total pump power coupled into the fiber at each injection point is ~40 mW, with the pump power in the fiber core everywhere being substantially below 1.0 mW (with the intensity everywhere being substantially below 0.04 mW/($\mu$m)$^2$) for any wavelength region in the pump radiation spectrum that is equal to the Brillouin linewidth in this fiber, approximately equal to 18 MHz. The cw pump radiation is bidirectionally coupled into the fiber by means of a grating and a wavelength-dependent coupler. The Raman gain of the signal pulses over the 40 km amplifier spacing essentially equals the signal loss over this distance, resulting in stable transmission of the soliton pulses, with an error rate $<10^{-9}$/bit achievable for bit rates up to 13 Gbit/sec. At the receiving end of the system, the pulses are detected by conventional means.

What is claimed is:

1. An optical fiber communications system with Raman amplification, the system comprising
   (a) first means for generating first electromagnetic radiation of wavelength $\lambda_o$, a length of optical fiber having a core and a cladding, detector means for detecting the first radiation, and means for coupling the first radiation into the optical fiber at a first fiber location, the coupled-in first radiation guided in the fiber to a second fiber location that is spaced apart from the first fiber location, at least some of the coupled-in first radiation emitted from the fiber at the second fiber location and detected by the detector means, the system further comprising
   (b) second means for generating second electromagnetic radiation, associated with the second radiation being a second radiation spectrum; and
   (c) means for coupling the second radiation into the optical fiber at a third fiber location that is intermediate the first and the second fiber locations;
   characterized in that
   (d) the second means comprise a multiplicity of second radiation sources selected to result in a second radiation spectrum having a width greater than the Brillouin linewidth of the optical fiber, and further selected such that the intensity of second radiation in the fiber at any wavelength $\lambda_p$ is less than a critical intensity $I_c$, where by "intensity of second radiation in the fiber at $\lambda_p$" is meant the average intensity of second radiation in the fiber core in a first spectral interval, the first spectral interval being centered on $\lambda_p$ and having a width equal to the Brillouin linewidth of the fiber at $\lambda_p$, and where $I_c$ is that average intensity of radiation in the fiber core in the first spectral interval that results in conversion of 10% of the radiation in the first spectral interval to stimulated Brillouin radiation.

2. Communications system of claim 1, wherein the second means comprise at least an i'th and a j'th second radiation source, associated with each second radiation source being a center wavelength and a spectral width, the i'th and j'th second radiation sources selected such that the center wavelengths of the i'th and the j'th second radiation sources differ by at least about the spectral width of the i'th second radiation source.

3. Communications system of claim 2, wherein at least the i'th and the j'th second radiation sources are semiconductor lasers.

4. Communications system of claim 2, wherein the first radiation is pulsed radiation, and the first radiation coupled into the optical fiber forms soliton pulses in the fiber.

5. Communications system of claim 2, wherein the optical fiber is silica-based optical fiber, $\lambda_o$ is in the range 1.2–1.6 μm, the second radiation spectrum contains a wavelength $\lambda_p$ that is about 0.1 μm shorter than $\lambda_o$, and the intensity of second radiation in the fiber at any wavelength in the second radiation spectrum is less than 0.04 mW/(μm)².

6. Communications system of claim 1, wherein the first radiation is pulsed radiation, and the second radiation is cw radiation.

* * * * *